(No Model.)
E. A. PARKS.
COMBINED SAW SET AND GUMMER.
No. 266,192. Patented Oct. 17, 1882.
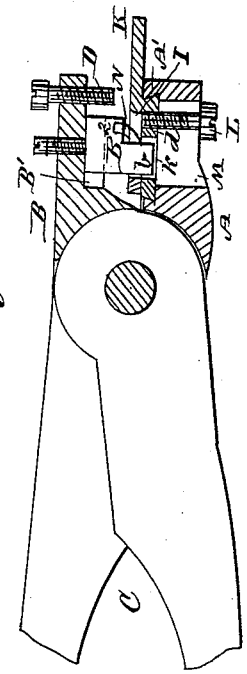
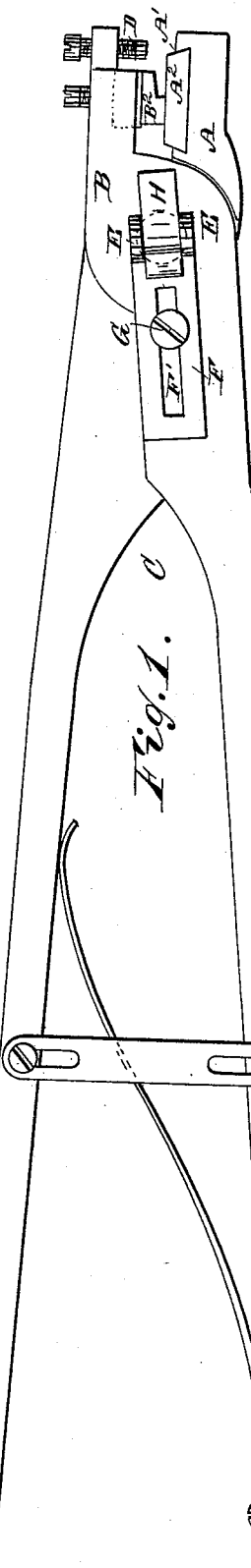
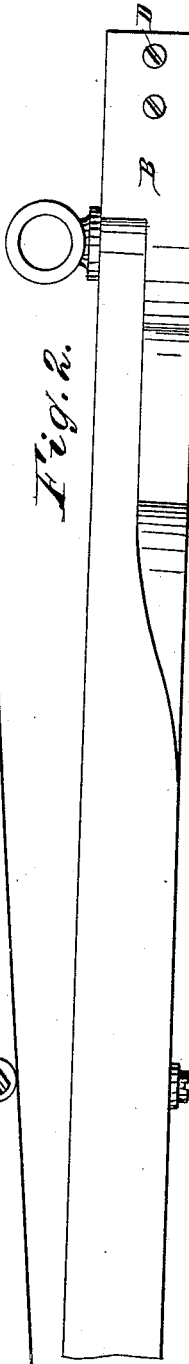
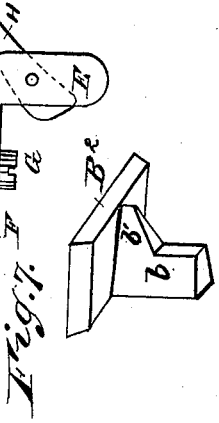
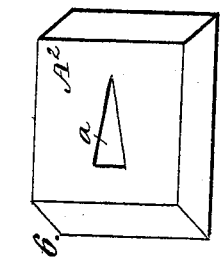
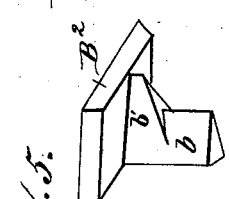
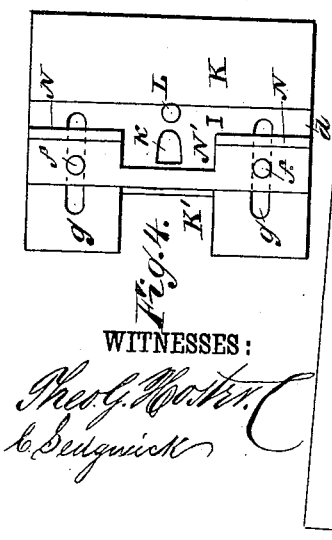
WITNESSES:
INVENTOR:
E. A. Parks
BY
ATTORNEYS.

UNITED STATES PATENT OFFICE.

ELIJAH A. PARKS, OF SOUTH BEND, ARKANSAS.

COMBINED SAW SET AND GUMMER.

SPECIFICATION forming part of Letters Patent No. 266,192, dated October 17, 1882.

Application filed May 2, 1882. (No model.)

*To all whom it may concern:*

Be it known that I, ELIJAH A. PARKS, of South Bend, in the county of Lincoln and State of Arkansas, have invented a new and Improved Saw Set and Gummer, of which the following is a full, clear, and exact description.

The object of my invention is to facilitate the gumming and setting of saws.

The invention consists in a pair of tongs provided with dovetail grooves in the inner surfaces of the jaws for receiving dies, with a check-screw and nut, and a saw-guide formed of a block pivoted between two jaws projecting from a plate held to the side of the tongs, whereby teeth will be cut in a saw placed between the jaws when the jaws are pressed together.

The invention also consists in a plate adapted to be secured on the lower jaw and provided with a saw-guide extending across it, whereby the teeth of a saw placed on this plate will be bent or set by pressing the jaws together.

Reference is to be had to the accompanying drawings, forming a part of this specification, in which similar letters of reference indicate corresponding parts in all the figures.

Figure 1 is a longitudinal elevation of my improved saw set and gummer. Fig. 2 is a plan view of the same. Fig. 3 is a longitudinal sectional elevation of the front end of the same, showing the setting-plate attached to the lower jaw. Fig. 4 is a plan view of the setting-plate. Fig. 5 is a perspective view of the male die for gumming the saw. Fig. 6 is a perspective view of the female die. Fig. 7 is a perspective view of a modified construction of the male die.

The jaw A of the tongs C is provided in its inner surface with a transverse dovetailed groove, A', adapted to receive a dovetailed female die, A², provided with a triangular aperture, $a$, of the same size as the space between the saw-teeth. The other jaw, B, is provided in its inner surface with a longitudinal dovetailed groove, B', adapted to receive the male die B², provided with a projection, $b$, fitting in the aperture $a$, and which cuts the metal placed on the female die A², thus forming the teeth.

A check-screw, D, passes through the jaw B in front of the die B², and this screw can be adjusted to prevent the jaws A and B from being brought too close together. Two jaws, E, project from a plate, F, provided with a longitudinal slot, F', through which a screw, G, passes into one of the shanks of the tongs for holding this plate F adjustably on this shank. A beveled or other block, H, is pivoted between the jaws E in such a manner that it will be inclined toward the side of the shank on which the plate F is held, and will also be inclined toward the ends of the jaws. This block H serves as a guide for the saw that is being gummed. Dies A² and B², of different sizes, can be held in the jaws A and B, according to the sizes of the teeth that are to be cut. The saw-plate is placed on the female die A², and the projection $b$ of the male die B² is forced through the edge of the saw-plate into the aperture or recess $a$ in the female die A². The guide H can be adjusted a greater or less distance from the ends of the jaws A B, as the circumstances may require.

If the implement is to be used as a saw-set, the die A² is removed. On the jaw A a plate, K, is secured, which has a dovetailed ridge, $d$, on its under side, which ridge is passed into the dovetailed groove, A', and a screw, L, is passed through a longitudinal slot, M, in the jaw A, into the plate K, for holding the plate K firmly on the jaw. The plate K has a longitudinal recess, I, on its upper face, and to it an angle-iron guide-strip, N, is attached transversely to the jaws A and B by means of screws $f$ passing through slots $g$ in the plate K at right angles to the guide-strip. This guide-strip N is provided with a recess, N', in its front edge, to permit the projection $b$ of the die B² to pass into the corresponding aperture, $k$, in the recess I of the plate K. The plate K is provided with a recess, K', in its rear edge, so that the sides of this recess K' can be at the side of the joint of the tongs, whereby the plate K will be held more firmly on the jaw A. The saw that is to be set is placed on the plate K in such a manner that the points of the teeth rest against the vertical ridge of the guide-strip N, and the teeth are bent down into the recess I by the portion $b'$ of the projection $b\ b'$ of the die B² when the jaws A and B are brought together, the portion $b$ of the projection $b\ b'$ passing through the aperture $k$ of the plate K.

Having thus described my invention, I claim as new and desire to secure by Letters Patent—

1. In a saw set and gummer, the combination, with the tongs C, provided with dovetailed grooves $A'$ and $B'$ in the jaws A and B, of the female die $A^2$, provided with a triangular aperture or recess, $a$, and the male die $B^2$, provided with a projection, $b\ b'$, fitting within the aperture or recess $a$, substantially as herein shown and described, and for the purpose set forth.

2. In a saw set and gummer, the combination, with the tongs C, of the dies $A^2\ B^2$, held in the jaws thereof, the plate F, provided with lugs E, and the block H, pivoted in these lugs, substantially as herein shown and described, and for the purpose set forth.

3. In a saw set and gummer, the combination, with the tongs C, of the dies $A^2\ B^2$, held in the jaws thereof, the longitudinally-slotted plate F, provided with lugs E, the block H, pivoted to these jaws, and the screw G, substantially as herein shown and described, and for the purpose set forth.

4. In a saw set and gummer, the combination, with the tongs C, of the die $B^2$ and the plate K, provided with an aperture, $k$, and a recessed guide-strip, N, extending across it, substantially as herein shown and described, and for the purpose set forth.

5. In a saw set and gummer, the combination, with the tongs C, of the die $B^2$, the plate K, having its outer portion raised above the inner portion, and of the guide-strip N, substantially as herein shown and described, and for the purpose set forth.

6. In a saw set and gummer, the combination, with the tongs C, of the die $B^2$, the plate K, and the screw L, passing through a slot, M, in the jaw A, substantially as herein shown and described, and for the purpose set forth.

ELIJAH A. PARKS.

Witnesses:
OSCAR F. GUNZ,
C. SEDGWICK.